May 2, 1967 SHICHIRO FUKATSU 3,317,152

APPARATUS FOR THE QUICK RETURN OF A RECORDING MEDIUM IN TAPE RECORDER

Filed June 16, 1965

2 Sheets-Sheet 1

INVENTOR

Shichiro Fukatsu

BY Stevens, Davis, Miller & Mosher

ATTORNEYS

May 2, 1967 SHICHIRO FUKATSU 3,317,152

APPARATUS FOR THE QUICK RETURN OF A RECORDING MEDIUM IN TAPE RECORDER

Filed June 16, 1965

2 Sheets-Sheet 2

INVENTOR

Shichiro Fukatsu

BY Stevens, Davis, Miller & Mosher

ATTORNEYS 3,317,152

APPARATUS FOR THE QUICK RETURN OF A RECORDING MEDIUM IN TAPE RECORDER

Shichiro Fukatsu, Yokohama, Japan, assignor to Victor Company of Japan, Limited, Kanagawa-ku, Yokohama, Japan, a corporation of Japan Filed June 16, 1965, Ser. No. 464,319
Claims priority, application Japan, June 24, 1964, 39/49,537
7 Claims. (Cl. 242—55.12)

The present invention relates to an apparatus capable of performing the quick return of a recording medium in order to repeatedly return to the same place on the recording medium during play back of a tape recorder and, in particular, to such an arrangement in which a charged condenser is used for a driving plunger for the tape back winding.

In a prior back winding apparatus of this kind, the back winding operation is carried out by operating a knob for back winding the recording medium, or the voltage of a charged condenser is supplied directly to the motor for driving a reel in order to reverse the direction of said motor. But in the former case, a desired amount of the recording medium can not be returned correctly at any desired time, and in the latter case, conversion of the rotational direction of the motor can not be performed rapidly, and the points of start and stop of the back winding are liable to become obscure.

The principal object of this invention is to provide a novel apparatus capable of performing a quick return of the recording medium as it is being played back on a tape recorder.

Another object of this invention is to provide a novel and useful apparatus which returns the recording medium while in the play back state for a predetermined period of time after a switch has been actuated.

A further object of this invention is to provide an apparatus in which a charged condenser operates a plunger for quick return.

A still further object of this invention is to provide an apparatus having an electrical circuit means in which said condenser is always charged during play back of the recording medium.

Figure 1:
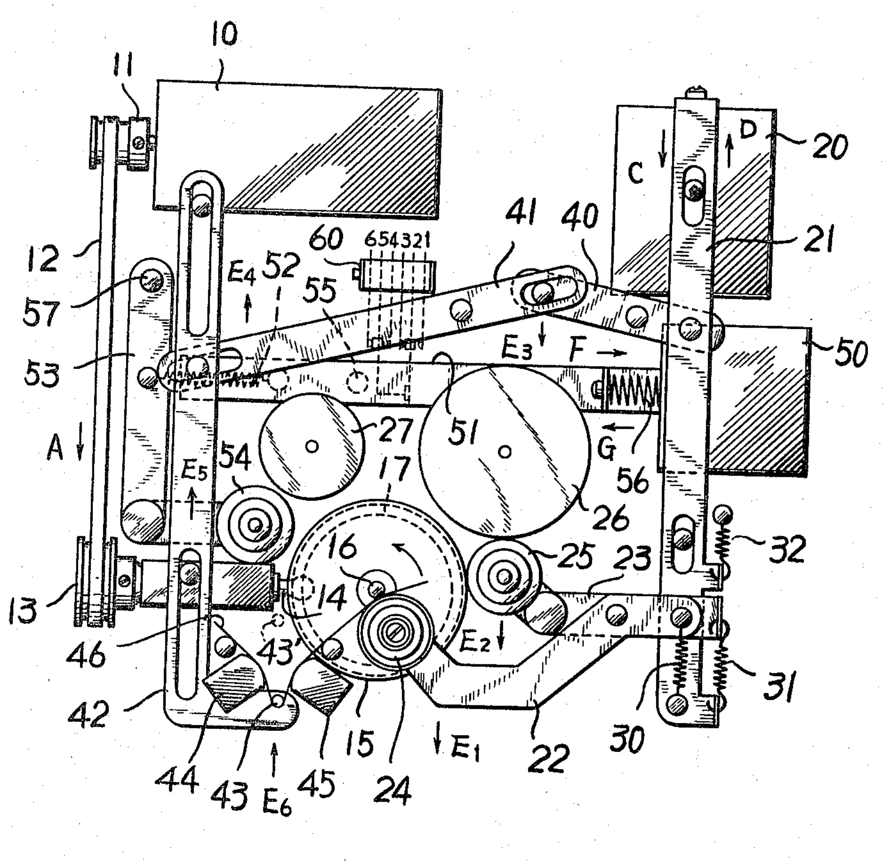
Figure 2:
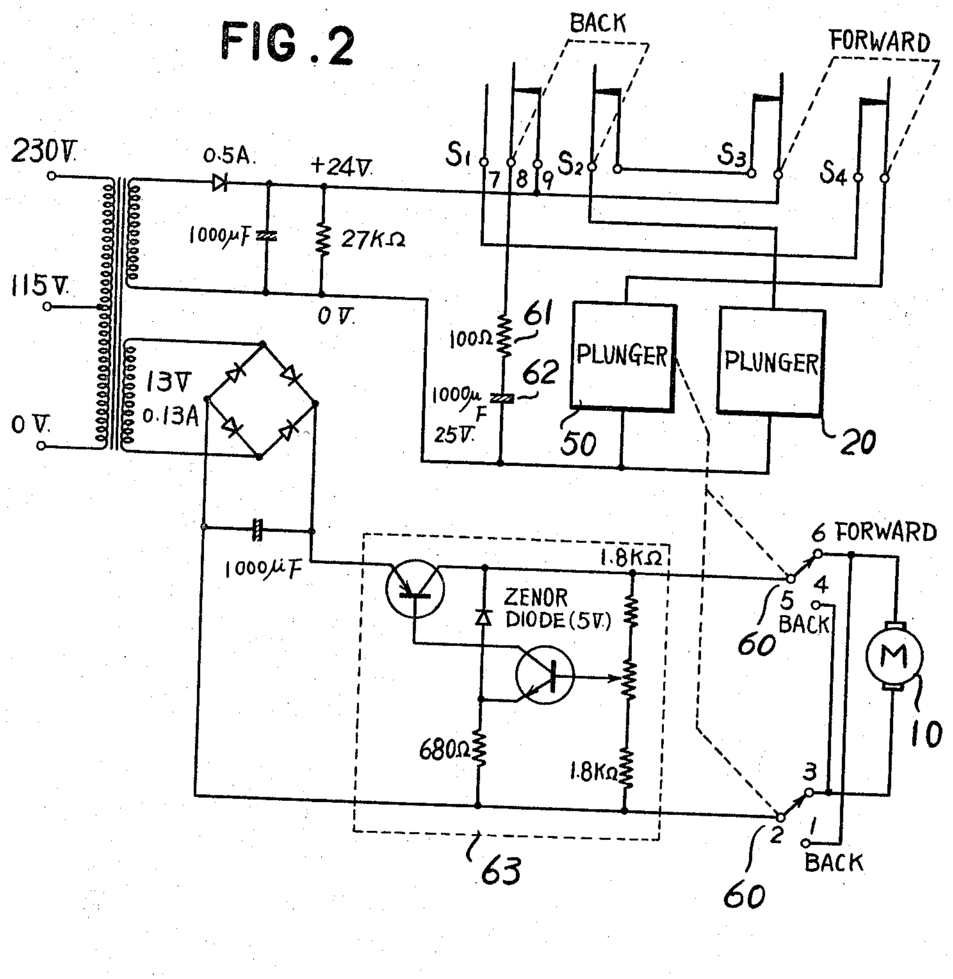

Other objects and characteristics will become apparent from the following description referring to the drawings, in which, FIG. 1 is a plan view showing a play back state of a tape recorder having a quick return means according to this invention; and FIG. 2 is a schematic view which shows an electric circuit necessary for operating the quick return means.

In the apparatus shown in FIG. 1, a motor pulley 11 is attached to a motor 10 fixed to a chassis. The revolution of said motor is transmitted to a drive pulley 13 via a belt 12 from said motor pulley 11 and said belt is rotated in a direction A in play back time. A rim shaft 14 which is fixed to said drive pulley and moved therewith is pressed to a rubber 17 baked to a capstan wheel 15 for preventing slip, and said capstan wheel is constructed in such a way that it may be rotated in a direction B with the revolution of the rim shaft. A plunger 20 in the play back state is in a state of operation by means of a corresponding electric circuit, and an operating lever 21 connected to said plunger is pulled in a direction C against a returning spring 32. Thus a pinch roller 24 is pressed in such a way that it may be in contact with a center shaft 16 of the capstan wheel by a lever 22, and a take up idler 25 is pressed between the capstan wheel and a wheel 26 for the take up reel by a lever 23. The pressing force for pressing the pinch roller 24 to the center shaft 16 of said capstan wheel is defined by a spring 30, and the pressing force for pressing said take up idler 25 between said capstan wheel 15 and the wheel 26 for said take up reel is defined by a spring 31, each of said pressing forces being adjusted in determined value, respectively. Simultaneously, with these operations, a tape shifter 43 is moved via levers 40, 41 and 42 connected with said operating lever 21 in such a way that a recording medium such as tape 46 is pressed to an erasing head 44 and a recording and reproducing head 45.

As a result, tape 46 passes through the required magnetic heads from the supply reel placed on a wheel 27 and is wound to the take up reel placed on a wheel 26 passing through between said pinch roller 24 and the center shaft 16 of said capstan wheel.

When a switch of the electric circuit is turned from said play back state as described above to the back winding state, an electric source for said plunger 20 is cut off, the operating lever 21 is returned in a direction D by means of the returning spring 32, and all the levers 22, 23, 40, 41 and 42 connected to said operating lever move in directions of $E_1$–$E_5$, respectively. Further, the pinch roller 24 and the take up idler 25 are released from their pressing state, and also the tape shifter 43 is moved to the position 43' with the movement of the lever 42 in a direction of $E_6$, and thus the tape 46 is wound back without contacting with said magnetic heads. At the same time, an electric source of a plunger 50 is entered by the electric circuit, and said plunger is moved in a direction F against the return spring 56. As a result, a plunger rod 51 connected with said plunger is moved and a switch 60 for changing over the rotational direction of the motor is changed from recording and play back end to back winding end by a stud 55 insulated electrically and attached to said plunger rod. The polarity of the electric source supplied to the motor 10 is thus changed and said motor is rotated in the reverse direction at play back state. The revolution of motor 10 is transmitted to the capstan wheel 15 via the motor pulley 11, belt 12, drive pulley 13 and rim shaft 14 and the capstan wheel is rotated in the reverse direction at play back state. At the same time, an operating lever 53 is rotated in an anticlockwise direction about hinged shaft 57 causing a displacement of plunger rod 51 connected with said operating lever 53 by a connecting spring 52. This causes a back winding idler 54 connected with said operating lever 53 to press between the capstan wheel 15 and the wheel 27 for the supply reel, this pressing force being defined by said connecting spring 52. Accordingly, the rotation of the capstan wheel 15 is transmitted to the wheel 27 for the supply reel via said back winding idler 54, and thus the recording medium can be wound back.

FIG. 2 shows an electric circuit necessary for operating the quick return means, each of the switches in said circuit showing a position in the play back state. Namely, gang switches $S_1$–$S_2$ and $S_3$–$S_4$ are closed, respectively, and a movable contact point 8 of the switch $S_1$ is connected with a fixed contact point 9 of the same. Now, a direct current transformed and rectified is applied from an alternating current source to said plunger 20 passing through the switches $S_3$, $S_2$ and the tape recorder is in play back state as described above. A condenser 62 which becomes an electric source for operating the plunger 50 for quick return is in a state of being charged via contact points 8 and 9 of $S_1$ and a resistance 61. An electric source for driving the motor 10 is connected with a switch 60 for changing over the rotational direction of the motor via a voltage stabilizing circuit 63 and now contact points, 2, 3 and 5, 6 are connected and the motor 10 is in the rotational direction at the recording and play back state.

In order to quick return, when the quick return switches $S_1$, $S_2$ are pushed, switch $S_2$ is opened and the contact points 7 and 8 of the switch $S_1$ are connected. As a result, the electric circuit for the plunger 20 is cut off by means of the switch $S_2$ and the recording and play back state is released as described above and at the same time said condenser 62 (in this embodiment, the capacity is 1000 $\mu$f.) is connected in parallel with the plunger 50 by the switch $S_1$ via $S_4$ and the resistance 61 (in this embodiment, the resistant value is 100Ω), and said plunger operates until the electric charge in said condenser is spent. Accordingly, a maximum time for quick return can be defined by varying the capacity of said condenser. When said plunger 50 operates, the switch 60 for changing over the polarity of the motor is operated, the contact points 1, 2 and 4, 5 are connected, and the rotational direction of the motor 10 is reversed. Of course, if said back winding switches $S_1$, $S_2$ are opened in the range of the capacity of said condenser 62, back winding operation is relieved immediately and play back state is restored. Namely, within a determined time any quick return can be accomplished. The discharge time of the condenser 62 and electric current flowing through the contact points of the switch $S_1$ are controlled and said contact points are protected by changing the value of the resistance 61 entering in series with said condenser.

When the discharge of said condenser 62 is ended, the plunger rod 51 returns in the direction G by the return spring 56 attached to the plunger 50 in FIG. 1, the switch 60 for changing over the rotational direction of the motor returns as entering in the play back end, and the rotational direction of the motor 10 is changed to the play back direction. As a result the back winding idler comes out between the wheel 27 for the supply reel and the capstan wheel 15, and thus the back winding operation of the recording medium is stopped.

When the quick return switches $S_1$, $S_2$ are brought back to the original position, the plunger 20 operates again and returns to the play back state. In this case, the condenser 62 is in condition to be charged. In this embodiment, the charging time of the condenser 62 is 0.2 sec. so that there is no hinderance even if back winding operations are repeated.

What I claim is:

1. An apparatus for advancing and re-winding the recording medium in a tape recorder, said apparatus comprising a first wheel adapted to receive a supply reel; a second wheel adapted to receive a takeup reel; a rotary drive means; a first coupling means and a second coupling means adapted to couple said rotary drive means to said first wheel and to said second wheel, respectively, to rotate said wheels and advance the recording medium from said supply reel to said takeup reel; a first actuating means and a second actuating means for actuating said first and second coupling means, respectively; means responsive to movement of one of said actuating means to reverse the rotary direction of said rotary drive means to reverse said wheels and effect re-winding of said recording medium from said takeup reel to said supply reel; a first and second energizing means for selectively energizing said first and second actuating means, respectively; electrical storage and discharge means for energizing said second energizing means; a power source connected in parallel with said first energizing means and said electrical storage means; and switch means for switchinig from a position wherein only said first energizing means and said electrical storage and discharge means are connected with said power source thereby effecting an advance of said recording medium, to a position wherein said first energizing means and said electrical storage means are disconnected from said power source and a closed circuit is made by only said second energizing means and said electrical storage and discharge means, thereby effecting an immediate re-winding of said recording medium.

2. The apparatus of claim 1 wherein said drive means comprises a rotary engine, a capstan wheel and a connecting means operatively coupling said capstan wheel to said engine.

3. The apparatus of claim 1 wherein said second energizing means is energized so as to take up said recording medium for a period of time determined by the discharge time of said electrical storage and discharge means.

4. An apparatus for advancing and re-winding the recording medium in a tape recorder, said apparatus comprising a first wheel adapted to receive a supply reel; a second wheel adapted to receive a takeup reel; a capstan wheel; drive means to rotate said capstan wheel; a first idler and a second idler adapted to couple said capstan wheel to said first wheel and to said second wheel, respectively, to rotate said wheels and advance the recording medium from said supply reel to said takeup reel; a first lever mechanism and a second lever mechanism for actuating said first and second idlers, respectively; means responsive to movement of said second lever mechanism to reverse the rotary direction of said drive means to reverse said wheels and effect re-winding of said recording medium from said takeup reel to said supply reel; a first and second energizing means for selectively energizing said first and second lever mechanisms, respectively; a capacitor for energizing said second energizing means; a power source connected in parallel with said first energizing means and said capacitor; and switch means for switching from a position wherein only said first energizing means and said capacitor are connected with said power source thereby charging said capacitor and effecting an advance of said recording medium, to a position wherein said first energizing means and said capacitor are disconnected from said power source and a closed circuit is made by only said second energizing means and said capacitor, thereby effecting a discharge of said capacitor and an immediate re-winding of said recording medium.

5. The apparatus of claim 3 wherein a resistance is inserted between said switch means and said capacitor for controlling the maximum energizing time of said second energizing means according to the time constant determined by said capacitor and said resistance.

6. The apparatus of claim 4 wherein said capacitor is a variable capacity type and thus may control the maximum energizing time of said second energizing means.

7. The apparatus of claim 4 wherein said lever mechanisms have protrusions for engaging and actuating an additional switching means to effect reversal of the direction of rotation of said drive means.

References Cited by the Examiner

UNITED STATES PATENTS

| | | | |
|---|---|---|---|
| 3,009,663 | 11/1961 | Armstead | 242—55.12 |
| 3,057,570 | 10/1962 | Smith | 242—55.12 |

FRANK J. COHEN, *Primary Examiner.*

L. D. CHRISTIAN, *Assistant Examiner.*